United States Patent
Izumi et al.

[11] Patent Number: 6,103,407
[45] Date of Patent: *Aug. 15, 2000

[54] MAGNETO-OPTICAL RECORDING MEDIUM AND METHOD OF USING SAME

[75] Inventors: Haruhiko Izumi; Masakazu Taguchi; Tomonori Ikeya; Tsutomu Tanaka; Toshio Sugimoto; Ken Tamanoi, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/165,902

[22] Filed: Oct. 2, 1998

Related U.S. Application Data

[62] Division of application No. 08/381,474, Jan. 31, 1995, Pat. No. 5,871,855.

[30] Foreign Application Priority Data

Mar. 15, 1994 [JP] Japan .................................. 6-044387
Sep. 19, 1994 [JP] Japan .................................. 6-223278

[51] Int. Cl.$^7$ ....................................................... G11B 5/66
[52] U.S. Cl. .................... 428/694 ML; 428/694 MM; 428/694 EC; 428/900; 369/13; 369/275.2; 369/283
[58] Field of Search .................. 428/694 ML, 694 MM, 428/694 EC, 900; 369/13, 275.2, 283

[56] References Cited

U.S. PATENT DOCUMENTS 4,467,383  8/1984  Ohta et al. ............................... 360/131

FOREIGN PATENT DOCUMENTS

| | | |
|---|---|---|
| 2031356 | 2/1990 | European Pat. Off. . |
| 3035446 | 2/1991 | European Pat. Off. . |
| 0454858 A1 | 4/1991 | European Pat. Off. . |
| 0454858A1 | 11/1991 | European Pat. Off. . |
| 454858A1 | 11/1991 | European Pat. Off. . |
| 0465853 A3 | 1/1992 | European Pat. Off. . |
| 0465859A3 | 1/1992 | European Pat. Off. . |
| 465859A2 | 1/1992 | European Pat. Off. . |
| 0478201A1 | 4/1992 | European Pat. Off. . |
| 478201A1 | 4/1992 | European Pat. Off. . |
| 5290420 | 11/1993 | Japan . |

*Primary Examiner*—Leszek Kiliman
*Attorney, Agent, or Firm*—Greer, Burns & Crain, Ltd.

[57] ABSTRACT

A magneto-optical recording medium which is adapted to realize a partial ROM with remarkable facility in providing software. The magneto-optical recording medium comprises a transparent substrate, a volatile magnetic recording layer formed on the transparent substrate and having a Curie temperature approximately equal to or lower than a temperature raisable in a recording/reproducing apparatus of a user, and a nonvolatile magnetic recording layer formed on the volatile magnetic recording layer and having a Curie temperature higher than the temperature raisable in the recording/reproducing apparatus of the user; wherein the nonvolatile magnetic recording layer is not initialized and is retained in a state immediately after manufacture of the medium.

14 Claims, 10 Drawing Sheets

● : Record mark
◌ : S-side magnetized portion
○ : N-side magnetized portion (46 dB)

(41 dB)

MAGNETO-OPTICAL RECORDING MEDIUM AND METHOD OF USING SAME

This is a divisional of application Ser. No. 08/381,474, filed Jan. 31, 1995 now U.S. Pat. No. 5,871,855.

BACKGROUND OF THE INVENTION

1. Field of the Invention

The present invention relates generally to a magneto-optical recording medium and, more particularly, to a recording medium having both a RAM part recordable, reproducible and erasable by a recording/reproducing apparatus of a user and a ROM part reproducible but not rewritable by such an apparatus.

2. Description of the Related Art

The problem of protecting the copyright of computer software is currently becoming important. From the standpoint to provide such protected software, a variety of measures have been adopted on media in an attempt to prevent illegal use thereof with unauthorized duplication, and the recent trend generally seems that the software is provided in the form of ROM. In a CD-ROM which is an optical recording medium employed frequently of late due to its advantage that a large amount of information is recordable, the entire plane thereof serves as a read-only area, and discrimination between a regularly distributed medium and an illegally exploited one can be achieved merely by deciding whether writing is possible or not.

However, as viewed from the user's standpoint, a CD-ROM is disadvantageous because of its insufficient degree of freedom in practical use due to slow reproduction and nonexistence of a recordable/erasable user area. For this reason, there is currently proposed, in place of the above-described medium, a partial ROM which is a magneto-optical recording medium having both a reproduction-only area and recording/reproduction area. In the conventional partial ROM medium known heretofore, indented pits (ROM pits) are previously formed in a part of a substrate to define an area where changes of the reflectivity are applied as reproduced signals, whereby a partial ROM is achieved. According to this method, provision of read-only software is rendered possible by the technique substantially equal to that for the CD-ROM.

Since a substrate of an optical disk is produced by a method of injection-molding a resinous material, a metallic stamper is first required to serve as a master in manufacture of a conventional partial ROM medium. Therefore, in providing new software, it is necessary to produce a stamper where new information has been recorded. Since highly advanced apparatus and techniques are required for producing such a stamper, any software provider having none of the adequate equipment needs to request production of a stamper and a substrate from a third party when providing a conventional partial ROM medium. And there exists another disadvantage that, in case any inconvenience is found in a stage after start of mass production, it has been impossible heretofore to debug such inconvenience in the conventional partial ROM medium. Also for prevention of copying or duplication of software, it may occasionally be desired to sell a medium with some specific information (such as manufacture number, serial number and so forth) readable by a recording/reproducing apparatus of a user. However, in the conventional partial ROM medium, it has been impossible heretofore to meet such requirements.

On an ordinary magneto-optical disk medium, a plurality of grooves and a plurality of lands are formed alternately, and the land disposed between the adjacent grooves is used as a recording track where record marks are formed by magnetization in different directions conforming with data. The recording region is divided into a plurality of sectors, and an ID signal is preformatted with pits at the top of each sector where data is recorded. The ID signal is detected from a change in the amount of the reflected light, and the data is detected from a change in the polarization angle of the reflected light obtained by the magnetic Kerr effect. However, in such a land recording system, there exists a problem that the track density cannot be raised since none of the grooves is used as a data recording area. For this reason, there is proposed a land-groove recording system which uses each groove as a recording track as well.

According to the land-groove recording system, it is possible to increase the track density, but due to the structure where the recording tracks are mutually proximate, there occurs a phenomenon termed crosstalk as the data signal on the adjacent recording track is mixed into the reproduced signal. However, such crosstalk of magneto-optically recorded data can be eliminated by the mask effect based on magnetically induced superresolution which is capable of reproducing any record mark smaller in diameter than the spot of a reproducing laser beam, as disclosed in, e.g., Japanese Patent Laid-open Nos. Hei 3 (1991)-88156, Hei 5 (1993)-81717 and Hei 5 (1993)-342670. On the land-groove recording medium, it is necessary to preformat pits in the grooves as well as in the lands. However, the magnetically induced superresolution is responsive to the signal which is represented by a change in the amount of the reflected light from the pits. As a result, crosstalk relative to such signal raises a problem because reproduction of the ID signal is impossible.

SUMMARY OF THE INVENTION

It is therefore an object of the present invention to provide a magneto-optical recording medium which is adapted to realize a partial ROM with remarkable facility in providing software.

Another object of the present invention resides in providing a land-groove recordable magneto-optical recording medium which is capable of achieving proper reproduction of an ID signal without generation of any crosstalk.

According to a first aspect of the present invention, there is provided a magneto-optical recording medium which comprises a transparent substrate; a volatile magnetic recording layer formed on the transparent substrate and having a Curie temperature approximately equal to or lower than a temperature raisable by a recording/reproducing apparatus of a user; and a nonvolatile magnetic recording layer formed on the volatile magnetic recording layer and having a Curie temperature higher than a temperature raisable by the recording/reproducing apparatus of the user; wherein the nonvolatile magnetic recording layer is not initialized and is retained in the state it is in immediately after manufacture of the medium.

On this magneto-optical recording medium, a part in its recording plane is recordable, reproducible and erasable by a medium manufacture and/or a software provider, while the part is usable, in a recording/reproducing apparatus of a user, as a ROM where only reproduction of recorded information is possible.

According to a second aspect of the present invention, there is provided a magnetically induced superresolution type magneto-optical recording medium where any record mark smaller in diameter than a spot of a reproducing laser beam can be reproduced. The recording medium comprises a transparent substrate having a plurality of lands and grooves formed alternately; a magnetic reproducing layer formed on the transparent substrate; a volatile magnetic recording layer formed on the magnetic reproducing layer; and a nonvolatile magnetic recording layer formed on the volatile magnetic recording layer; wherein the volatile magnetic recording layer has a Curie temperature approximately equal to or lower than a temperature raisable in a recording/reproducing apparatus of a user; the nonvolatile magnetic recording layer has a Curie temperature higher than the temperature raisable by the recording/reproducing apparatus of the user; and the nonvolatile magnetic recording layer has an ID signal recorded magneto-optically at the top of each data recording sector formed in both of the lands and the grooves.

According to the first aspect of the present invention, software is recorded in a nonvolatile magnetic recording layer in a ROM part by the use of an exclusive recording/reproducing apparatus of a medium manufacturer or a software provider. Meanwhile in the remaining area of the medium, the nonvolatile magnetic recording layer is retained in an "as-deposition" state immediately after manufacture of the medium, and the volatile magnetic recording layer alone is initialized to be utilized as a user area (RAM part).

Consequently, when a user performs an erasing or recording operation by a commercially available magneto-optical disk apparatus, the recorded information held in the nonvolatile magnetic recording layer of the ROM part is transferred to the volatile magnetic recording layer regardless of either of such operations, so that there exists no possibility of erroneously erasing the software provided for the user. Meanwhile in the RAM part, this overriding influence is not exerted on the volatile magnetic recording layer since the partial magnetization is random in the nonvolatile magnetic recording layer, and therefore the volatile magnetic recording layer can be magnetized exactly in compliance with an external magnetic field, whereby the user is permitted to use this area freely.

According to the second aspect of the present invention, an ID signal is magneto-optically recorded in each of the lands and the grooves. And due to the mask effect based on magnetically induced superresolution, such an ID signal can be reproduced properly without causing any crosstalk at all. In addition, since the ID signal is recorded in the nonvolatile magnetic recording layer, high reliability can be ensured.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1A:
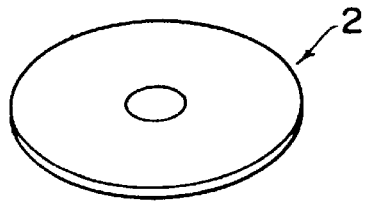
FIG. 1A is a perspective view of a magneto-optical recording medium in a first embodiment of the present invention.
Figure 1B:
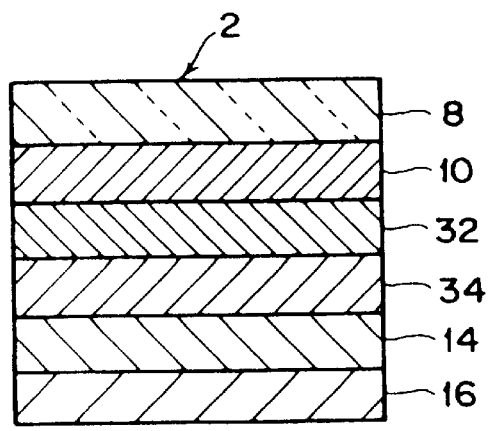
FIG. 1B is a structural sectional view thereof.

FIG. 1A illustrates an optical disk 2 in a first embodiment of the present invention, and FIG. 1B shows an exemplary medium structure. A SiN dielectric layer 10 having a film thickness of 80 nm is formed on a polycarbonate substrate 8, and a volatile magnetic layer (first magnetic layer) 32 composed of DyFeCo and having a film thickness of 50 nm is formed on the layer 10. Further a nonvolatile magnetic layer (second magnetic layer) 34 composed of TbCo and having a film thickness of 50 nm is formed on the volatile magnetic layer 32. Thereafter a SiN dielectric layer 14 having a film thickness of 80 nm is formed on the nonvolatile magnetic layer 34. The above layers 10, 32, 34 and 14 are shaped into films by the technique of sputtering.

The volatile magnetic layer 32 has a coercive force of 6 kOe or so at a room temperature and contains a rare-earth rich composition whose Curie temperature and compensation temperature are about 250° C. and 70° C. respectively. Meanwhile the nonvolatile magnetic layer 34 has a coercive force of 2–3 kOe or so at a room temperature and contains a rare-earth rich composition whose Curie temperature and compensation temperature are about 300° C. and 200° C. respectively. In addition to the above, a reflecting film 16 of aluminum is further formed on the dielectric layer 14.

Figure 2:
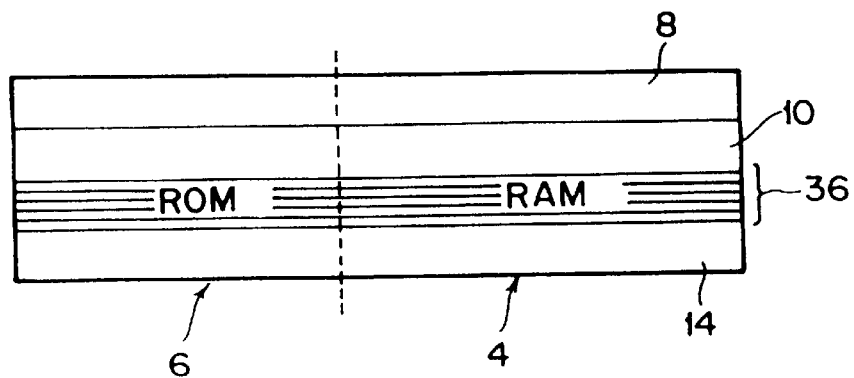
FIG. 2 is a schematic diagram illustrating how the recording medium of the first embodiment is used.

FIG. 2 illustrates an exemplary use of the medium in the first embodiment. More specifically, the magneto-optical disk 2 in this embodiment has a recording layer 36 composed of a volatile magnetic layer 32 and a nonvolatile magnetic layer 34, so that a user is enabled to selectively use a RAM part 4 which is recordable, reproducible and erasable, or a ROM part 6 which is reproducible only. It is a matter of course that the entire medium can be handled like an ordinary magneto-optical disk used normally as a RAM part.

Figure 3:
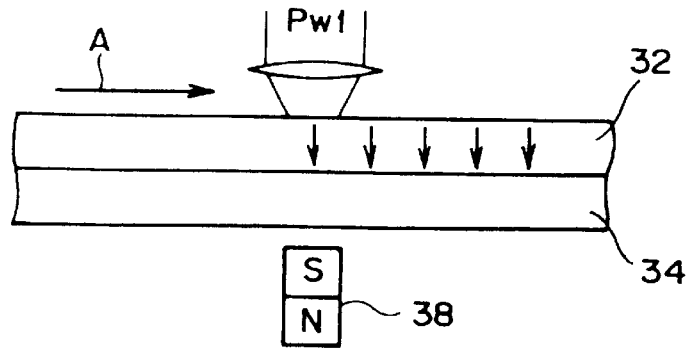
FIG. 3 is a schematic diagram illustrating how the first embodiment is initialized.
Figure 4:
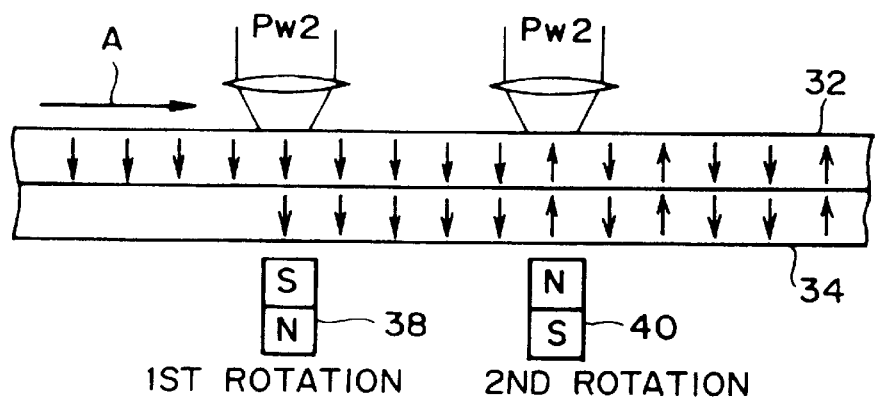
FIG. 4 is a schematic diagram illustrating how a ROM part in the first embodiment is recorded.

Referring now to FIGS. 3 and 4, a description will be given on a method of recording information in the form of a ROM on the magneto-optical disk 2 of the first embodiment. First, as shown in FIG. 3, a laser beam of a power Pw1 is irradiated to heat the volatile magnetic layer 32 up to the proximity of its Curie temperature, and the volatile magnetic layer 32 is initialized while an external magnetic field is applied thereto from a magnet 38. In this stage of the operation, the maximum temperature of the medium never reaches the Curie temperature of the nonvolatile magnetic layer 34, so that there is no possibility of initializing this magnetic layer 34. An arrow A indicates the direction of rotation of the disk.

Next, a method of recording information in the ROM part will be described below with reference to FIG. 4. First, a laser beam of a power Pw2, which is higher than the foregoing power Pw1, is irradiated during the first rotation of the disk to thereby heat the medium up to the proximity of the Curie temperature of the nonvolatile magnetic layer 34, and this layer 34 is initialized with application of an external magnetic field from the magnet 38.

Subsequently, while the laser beam of the power Pw2 is applied during the second rotation of the disk, an external magnetic field, which is inverse to the one at the time of initialization, is applied from a magnet 40 to thereby record the information. In this embodiment where the rotation velocity of the disk is set to 9 m/sec, the above condition is satisfied by setting the powers Pw1 and Pw2 to 7 mW and 12 mW or so respectively. The essential point resides in that an operation of recording the information in the ROM part may be performed in such a manner that adequate temperature conditions can be achieved by the use of a medium so designed as to conform with the above-described physical conditions.

The information recorded in the nonvolatile magnetic layer 34 by the operation of FIG. 4 can be neither rewritten nor erased in a magneto-optical disk apparatus operated normally by a user. More specifically, in a magneto-optical disk apparatus operated normally by a user, the disk temperature cannot be raised beyond the Curie temperature of the volatile magnetic layer 32. Therefore, when new information is to be recorded in the volatile magnetic layer 32, the former information is still left unerased in the nonvolatile magnetic layer 34, and consequently the volatile magnetic layer 32 is returned to the former recording state by the exchange bonding force or switched connection in the cooling process of the medium. Accordingly, the disk serves substantially as a ROM for the user and there exists no possibility of danger that the acquired information is lost due to accidental or erroneous erasure of the recorded information.

Figure 5:
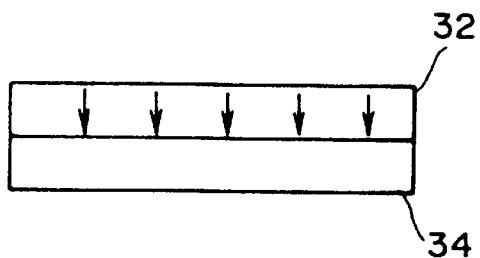
FIG. 5 schematically shows a magnetized state of a RAM part in the first embodiment.

However, the operation shown in FIG. 4 is performed merely with regard to the area required for recording the information, so that any other area inclusive of the nonvolatile magnetic layer 34 is not initialized as shown in FIG. 5 and is retained in an as-deposition state immediately after manufacture of the medium. Consequently it is always possible to erase the information in the volatile magnetic layer 32 or to record new information therein, and the user is enabled to use this magnetic layer as a RAM area. If a specific ID is prerecorded in a portion of the ROM area by a software provider and an operation needed for erasing such ID is previously programmed in the software, then the ID cannot be read by any illegally copied software, so that it is rendered impossible for the user to start the software, hence ensuring effective protection of the copyright of the software.

Figure 6:
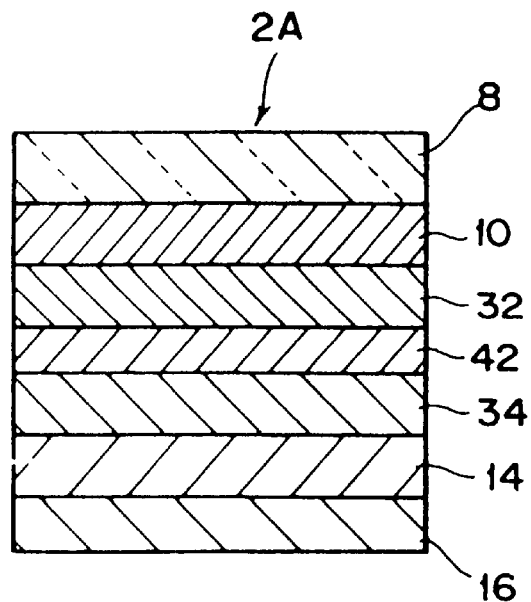
FIG. 6 is a sectional view of a magneto-optical recording medium in a second embodiment of the present invention.

FIG. 6 shows an exemplary medium structure of a magneto-optical disk 2A in a second embodiment of the present invention. In this embodiment, a nonmagnetic intermediate layer 42 composed of SiN, for example, is inserted between a volatile magnetic layer 32 and a nonvolatile magnetic layer 34. In the case of this embodiment, the volatile magnetic layer 32 and the nonvolatile magnetic layer 34 are magnetostatically coupled to each other. This second embodiment functions approximately similarly to the aforementioned first embodiment.

Figure 7:
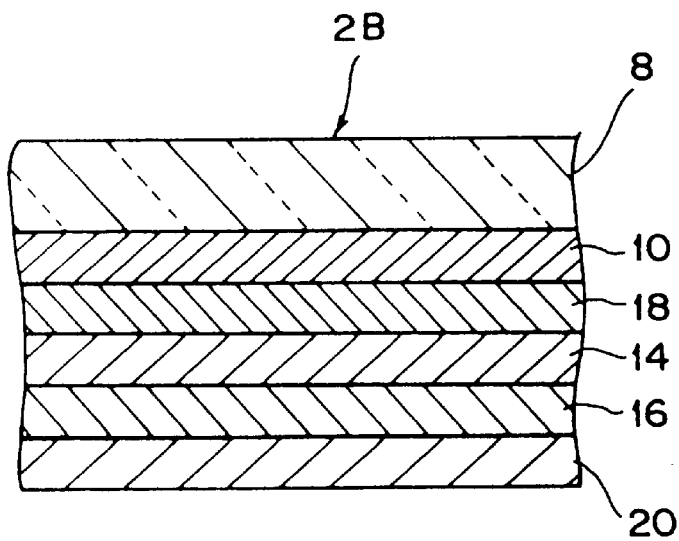
FIG. 7 is a sectional view of a magneto-optical recording medium in a third embodiment of the invention.

FIG. 7 shows an exemplary structure of a magneto-optical disk medium 2B used by a recording method in a third embodiment of the invention. The magneto-optical disk 2B has a laminated structure wherein a SiN protective layer 10, a DyFeCo recording layer 18, a SiN protective layer 14, an Al reflecting layer 16 and a resin coating layer 20 are superposed successively on a polycarbonate substrate 8 where ID signal pits and tracking grooves are formed. This magneto-optical disk 2B is a typical one used in general currently. In an ordinary mode of magneto-optically recording rewritable data, the magneto-optical disk 2B is rotated at a peripheral velocity of 9.0 m/sec, and a recording laser power of 10.5 mW is irradiated to the magneto-optical disk 2B while a recording magnetic field of 300 Oe is applied thereto.

Figure 8A:
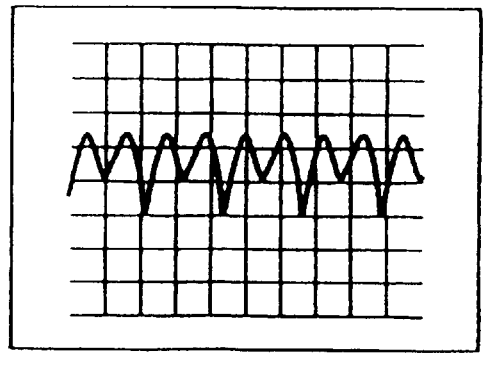
FIG. 8A graphically shows the waveform obtained by reproducing recorded data on the medium of the third embodiment.

Under the conditions including a peripheral velocity of 10 m/sec, a recording laser power of 15.9 mW and a recording magnetic field of 300 Oe, 8 T signals (where T=clock period) modulated by a code (2, 7) RLL were recorded at pit positions with a density of 0.78 μm/mark. FIG. 8A graphically shows the waveform obtained by reproducing such recorded data at a peripheral velocity of 9.0 m/sec and a reproducing laser power of 1.0 mW, with the record track pattern obtained thereat. A magnetization inverted area (hatched area: S-side magnetized portion) is formed on an erased record track, and an area (black area: record mark) with a change of the magnetization characteristics (where the Kerr effect is no longer existent due to the loss of perpendicular magnetic anisotropy) is formed in a high-temperature region substantially at the center of the hatched area, so that the reproduced signal waveform becomes a pattern of repeated Ms.

Figure 8B:
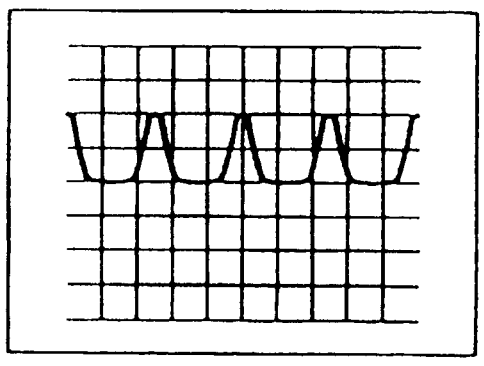
FIG. 8B graphically shows the reproduced waveform obtained after an erasing operation.
Figure 8C:
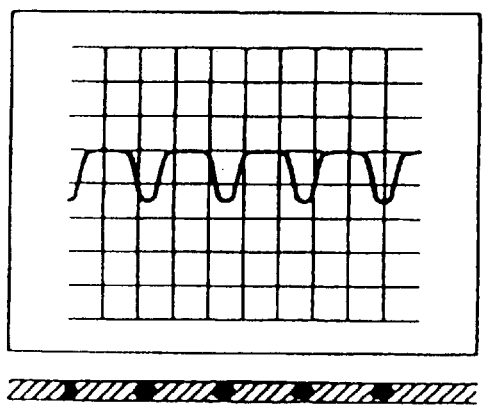
FIG. 8C is similar to FIG. 8B but showing the reprduced waveform when a magnetic field applied thereto is reversed.

FIG. 8B graphically shows the reproduced waveform obtained after an erasing operation on the data-recorded magneto-optical disk under the conditions including a peripheral velocity of 9.0 m/sec, an erasing laser power of 10.5 mW and an erasing magnetic field of 300 Oe, with the record track pattern obtained thereat. It is seen from this graph that the formed record marks are not erased even by such erasing operation, hence verifying proper performance of nonvolatile recording. FIG. 8C graphically shows the reproduced waveform obtained after an erasing operation performed under the same erasing conditions as above, with the exception that the applied magnetic field is directionally inverted, with the record track pattern obtained thereat. It is seen from this graph that the data once recorded is not erased even by inverting the applied magnetic field.

Figure 9:
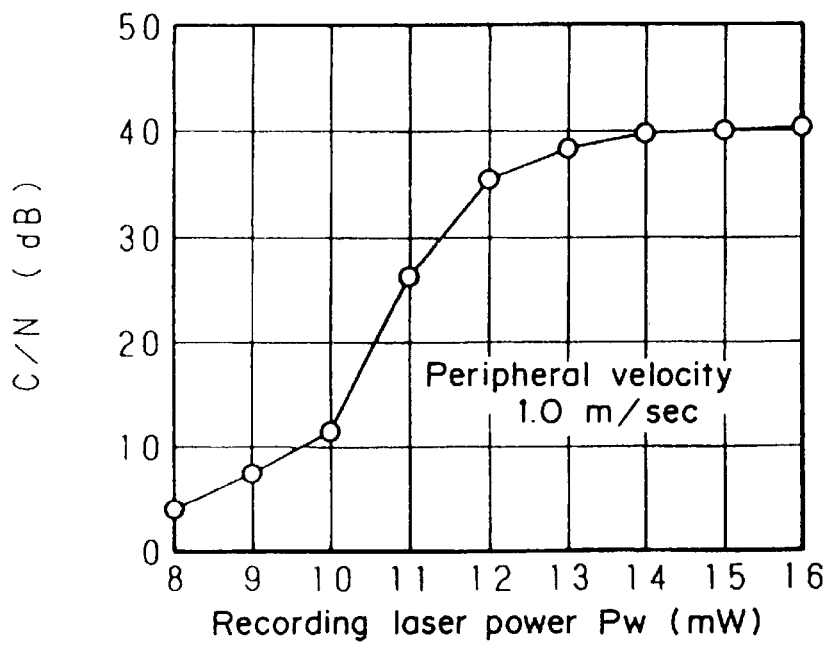
FIG. 9 graphically shows the relationship between a recording laser power and the C/N of a reproduced waveform obtained at a fixed peripheral velocity.

Whether any unerasable record mark is formed or not is concerned with the amount of the irradiation energy, so that there exists a mutual relationship between the peripheral velocity of the disk and the recording laser power. FIG. 9 graphically shows the C/N characteristics of the reproduced waveform obtained by first recording the data while setting the peripheral velocity fixedly to 1.0 m/sec and changing the recording laser power, and then performing an erasing operation under the above conditions. Supposing now that the peripheral velocity of the disk is 9.0 m/sec for example, it is impossible to perform nonvolatile recording if the recording laser power is lower than 15.9 mW. However, in case the peripheral velocity of the disk is 1.0 m/sec, nonvolatile recording can be performed with a recording laser power of 12 mW or more. Thus, the lower the peripheral velocity of the disk, the lower the recording laser power required for nonvolatile recording.

Figure 10A:
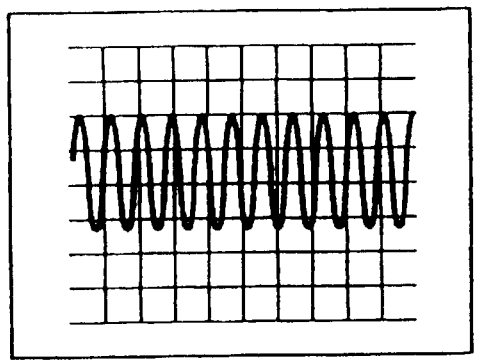
FIG. 10A shows a reproduced waveform obtained by an ordinary magneto-optical recording method.
Figure 10B:
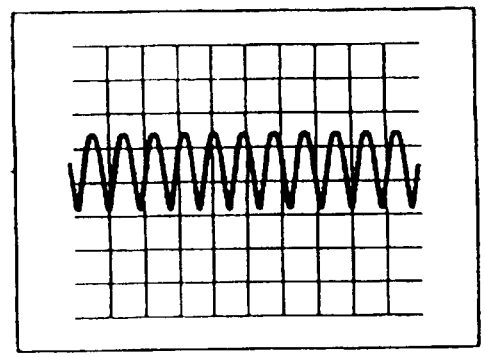
FIG. 10B is similar to FIG. 10A but showing a reproduced waveform obtained by a recording method of the third embodiment.

FIGS. 10A and 10B graphically show the reproduced waveforms of 3 T signals modulated by a code (2, 7) RLL and recorded at pit positions with a recording density of 0.78 $\mu$m/mark by the ordinary magneto-optical recording method and the recording method of this embodiment, respectively. The C/N representing the signal quality is 46 dB in ordinary magneto-optical recording as shown in FIG. 10A but is 41 dB in the recording method of this embodiment as shown in FIG. 10B. However, it is still possible to sufficiently achieve satisfactory reproduction, and properly reproduced signals can be obtained as in an ordinary reproduction mode for magneto-optically recorded signals. The difference between the C/N of the reproduced signal by the ordinary magneto-optical recording method and that of the reproduced signal by the recording method of this embodiment is derived from the fact that, as shown in FIGS. 11A and 11B, the amplitude of the reproduced signal obtained by the recording method of this embodiment is approximately ½ of the amplitude of the reproduced waveform by the ordinary magneto-optical recording method.

Figures 11A, 11B:
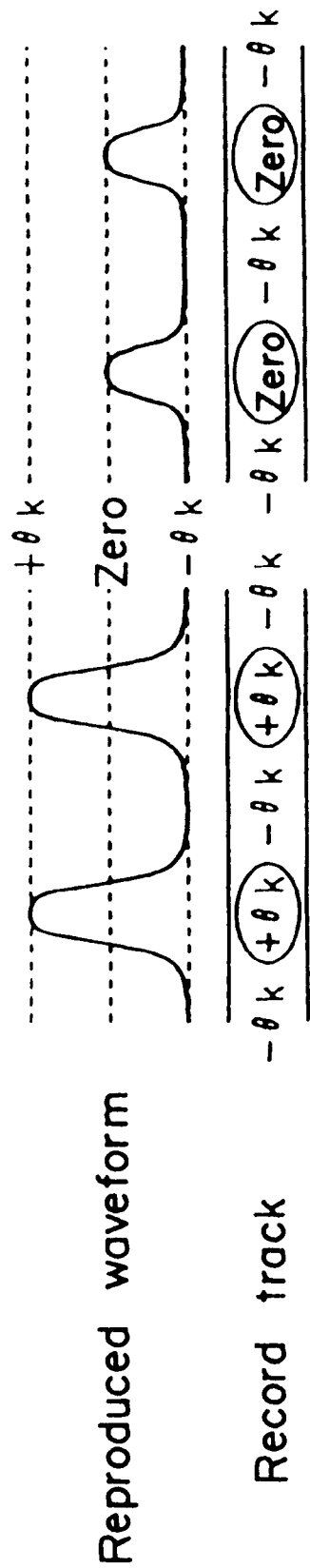
FIG. 11A shows a reproduced waveform and record mark obtained by the ordinary magneto-optical recording method.
FIG. 11B is similar to FIG. 11A but shows a state obtained by the recording method of the third embodiment.

In the ordinary recording, the polarization angle becomes +θk or −θk depending on the direction of magnetization as shown in FIG. 11A. The record mark formed by the method of this embodiment is such that the magnetic Kerr effect is lost in the mark portion and the change of the polarization therein is substantially zero, so that the amplitude of the reproduced waveform is reduced to be approximately ½ as shown in FIG. 11B. When the medium portion recorded by the method of this embodiment is reproduced according to a light amount change signal, substantially none of the reproduced signal is obtained. It is considered therefore that the recording layer is not crystallized by a recording power which is adequate to perform nonvolatile recording by the method of this embodiment.

It is obvious from the above that, in the recording method of this embodiment, nonvolatile data recording is not performed according to a structural change (crystallization or amorphization) of the recording layer but is performed according to a change of the magnetic characteristics of the recording layer. It is further considered that the perpendicular magnetic anisotropy is decreased and the change of the polarization angle based on the magnetic Kerr effect due to the perpendicular magnetization is reduced approximately to zero. Although DyFeCo is selectively employed to compose the recording layer in this embodiment, GdFeCo may be employed as well.

Since the method of this embodiment performs nonvolatile recording at a lower peripheral velocity and/or a higher recording laser intensity than those in the ordinary magneto-optical recording, it is also possible to execute a write-once nonvolatile recording function in addition to the ordinary magneto-optical magnetic recording function. Furthermore an exclusive write-once recording layer need not be provided in particular, so that a nonvolatile data recording operation can be performed without the necessity of any specific process on a commercially available ordinary magneto-optical disk medium. As nonvolatile data is recordable merely by changing the peripheral velocity and/or the laser power in the recording mode, the required recording/reproducing system is the same as for rewritable data. Therefore a nonvolatile data recording/reproducing operation can be performed with remarkable simplicity and ease, whereby the nonvolatile data recording area can be set to any desired dimensions.

Figure 12A:
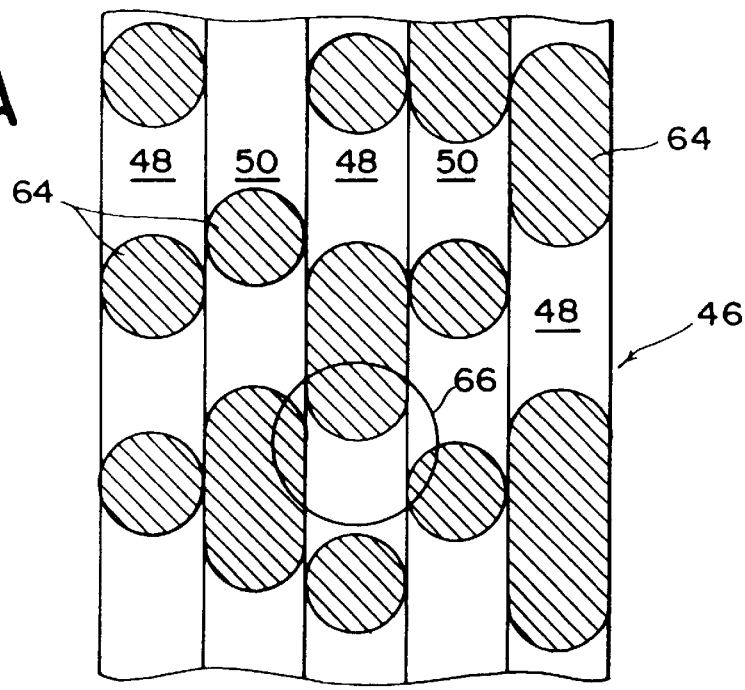
FIG. 12A is a partially cutaway plan view of a magneto-optical recording medium in a fourth embodiment of the invention.
Figure 12B:
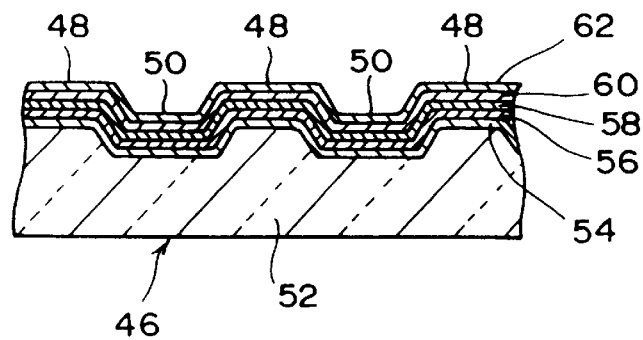
FIG. 12B is a partially cutaway sectional view thereof.

Referring next to FIGS. 12A and 12B, a description will be given with regard to a fourth embodiment wherein the nonvolatile magnetic recording layer mentioned in connection with the first embodiment is formed on a land-groove recording medium where data is recorded in both lands and grooves. As illustrated in FIG. 12(A), a magneto-optical recording medium 46 has a plurality of lands 48 and grooves 50 formed alternately, and record marks 64 are formed in both of such lands 48 and grooves 50.

As illustrated in FIG. 12B, a plurality of lands 48 and grooves 50 are formed alternately on a transparent substrate 52. A dielectric layer 54 is formed on the transparent substrate 52, and a magnetic reproducing layer 56 composed of GdFeCo or the like is formed on the dielectric layer 54. The reproducing layer 56 consists of a perpendicular magnetization film. A volatile magnetic recording layer 58 composed of TbFeCo or the like is formed on the reproducing layer 56. This volatile magnetic recording layer 58 consists of a perpendicular magnetization film. Further a nonvolatile magnetic recording layer 60 composed of TbCo or the like is formed on the volatile magnetic recording layer 58. This nonvolatile magnetic recording layer 60 consists of a perpendicular magnetization film. The Curie temperature of the volatile magnetic recording layer 58 is approximately 250° C., and that of the nonvolatile magnetic recording layer is approximately 350° C. And finally, a dielectric protective layer 62 is formed on the nonvolatile magnetic recording layer 60 to thereby complete a magneto-optical recording medium 46.

Figure 13:
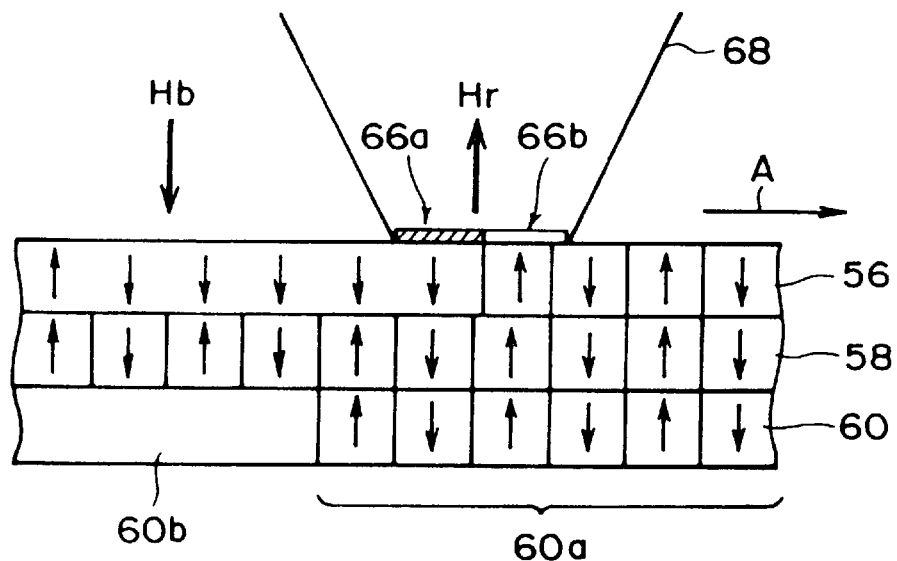
FIG. 13 illustrates how the fourth embodiment is reproduced.

Hereinafter an ID signal reproducing method relative to the fourth embodiment will be described with reference to FIG. 13. The nonvolatile magnetic recording layer 60 has an ID area 60a at the top of each sector where data is to be recorded. And an ID signal is recorded magneto-optically in the ID area 60a. The ID signal in the ID area 60a is recorded by irradiating a high-power laser beam which exceeds the Curie temperature of the nonvolatile magnetic recording layer 60. In a modification, the ID signal may be recorded by the use of an ordinary recording power under the condition that the peripheral velocity of the recording medium is lowered. Each sector has a data area 60b in succession to the ID area 60a. The data area 60b in the nonvolatile magnetic recording layer 60 is retained in an as-deposition state without being initialized at all. Since a land-groove recording technique is adopted in this embodiment, the ID area is provided in both of the lands 48 and the grooves 50.

The recording medium is moved in the direction indicated by an arrow A, and merely the reproducing layer 56 alone is initialized first by an initializing magnetic field Hb. subsequently a reproducing laser beam 68 is irradiated to the recording medium while a reproducing magnetic field Hr is applied thereto in the reverse direction with respect to the initializing magnetic field Hb, so that there are formed, within the beam spot, a low temperature region 66a maintained in the direction of the initializing magnetic field applied to the reproducing layer 56, and also a high temperature region 66b whose direction of magnetization in the reproducing layer 56 is inverted by the reproducing magnetic field Hr. The low temperature region 66a serves as a mask since the magnetization in the reproducing layer 56 is directionally uniform in conformity with the initializing magnetic field Hb. Meanwhile in the high temperature region 66b, the direction of magnetization of the ID signal recorded in the nonvolatile magnetic recording layer 60 is transferred to the reproducing layer 56 via the volatile magnetic recording layer 58, so that the ID signal can be read out through the high temperature region 66b in the beam spot.

Even if a recording or erasing laser power used in an ordinary magneto-optical disk apparatus is irradiated to the ID area 60a, the ID signal in the nonvolatile magnetic recording layer 60 is not destroyed, and during the process of fall of the temperature, the ID signal is transferred to the volatile magnetic recording layer 58 by exchange bonding force, whereby the ID signal is protected from destruction. The ID signal recorded in the nonvolatile magnetic recording layer 60 can be read out only from the high temperature region 66b in the beam spot according to the principle of magnetically induced superresolution, and consequently there exists no possibility that a problem of crosstalk arises between adjacent tracks.

Figure 14:
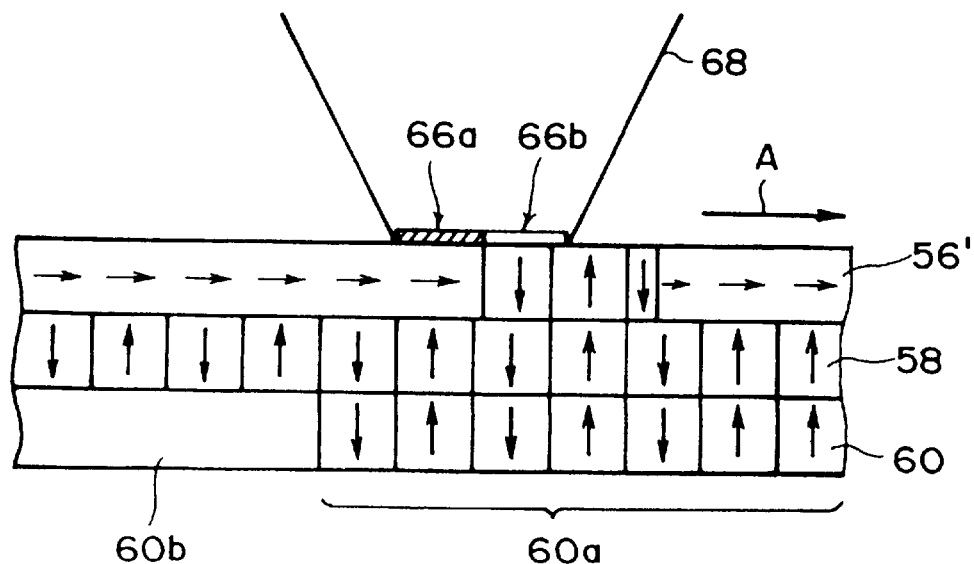
FIG. 14 illustrates how a fifth embodiment of the invention is reproduced.

Now a method of reproducing a fifth embodiment of the present invention will be described below with reference to FIG. 14. In a magneto-optical recording medium of this embodiment, a reproducing layer 56' is different from the aforementioned reproducing layer 56 in the foregoing fourth embodiment of FIG. 13 in the point that the layer 56' indicates in-plane magnetization at a room temperature but transits from in-plane magnetization to perpendicular magnetization when heated beyond a predetermined temperature by a reproducing laser beam. Any other structure of this embodiment is substantially the same as that of the fourth embodiment shown in FIG. 13. When a reproducing laser beam 68 is irradiated to the recording medium, a low temperature region 66a indicating in-plane magnetization and a high temperature region 66b indicating perpendicular magnetization are formed in the reproducing layer 56' within a beam spot. An ID signal recorded in an ID area 60a of a nonvolatile magnetic recording layer 60 cannot be read out therefrom since the reproducing layer 56' serves as an in-plane mask in the low temperature region 66a within the beam spot.

Meanwhile in the high temperature region 66b within the beam spot, the easy direction of magnetization in the reproducing layer 56' is turned to be perpendicular from the in-plane direction, so that the ID signal recorded in the nonvolatile magnetic recording layer 60 is transferred to the reproducing layer 56' via the volatile magnetic recording layer 58, whereby the ID signal can be read out therefrom through the high temperature region 66b within the beam spot. In this embodiment also, the ID signal is not destroyed even with irradiation of a recording or erasing laser power as described, and a lower temperature mask is formed within the beam spot so that the ID signal can be reproduced with magnetically induced superresolution, hence preventing any crosstalk of the ID signal between mutually adjacent tracks.

Figure 15:
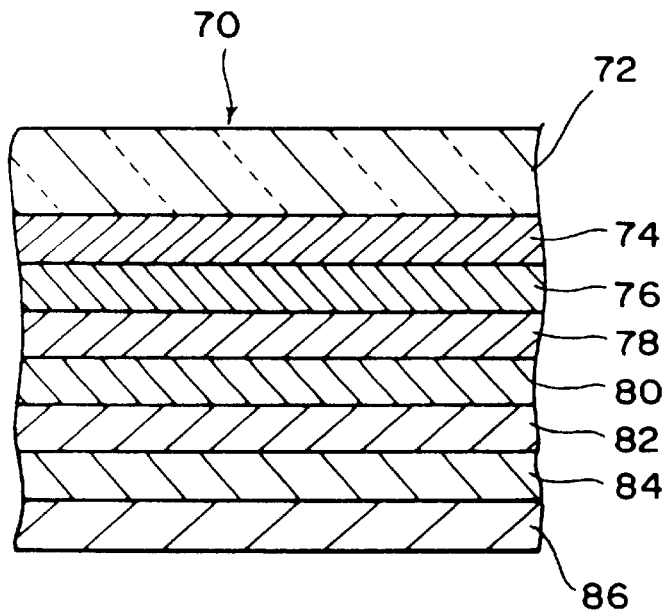
FIG. 15 is a sectional view of a magneto-optical recording medium in a sixth embodiment of the invention.

Referring next to FIG. 15, a description will be given on the structure of a magneto-optical recording medium 70 in a sixth embodiment of the present invention. A SiN dielectric layer 74 is formed on a transparent substrate 72. And a reproducing layer 76 composed of $Gd_{30}Fe_{55}Co_{15}$ is formed on the dielectric layer 74. The reproducing layer 76 is turned from in-plane magnetization to perpendicular one when heated beyond a first predetermined temperature. A reproducing auxiliary layer 78 composed of $Gd_{24}Fe_{53}Co_{23}$ is formed on the reproducing layer 76. The reproducing auxiliary layer 78 is turned from perpendicular magnetization to in-plane one when heated beyond a second predetermined temperature. And a switch layer 80 composed of $Tb_{20}Fe_{78}Co_2$ is formed on the reproducing auxiliary layer 78. Further a volatile magnetic recording layer 82 composed of $Tb_{19}Fe_{67}Co_{14}$ is formed on the switch layer 80. And a nonvolatile magnetic recording layer 84 composed of $Tb_{23}Co_{77}$ is formed on the volatile magnetic recording layer 82.

The Curie temperatures of the above-described reproducing layer 76, reproducing auxiliary layer 78, switch layer 80, volatile magnetic recording layer 82 and nonvolatile magnetic recording layer 84 are 330° C., 280° C., 145° C., 260° C. and 350° C., respectively. Such layers are 40 nm, 25 nm, 10 nm, 40 nm and 50 nm in film thickness repsectively. In addition to the above, a SiN protective layer 86 is formed on the nonvolatile magnetic recording layer 84 to complete a magneto-optical recording medium 70.

Figure 16:
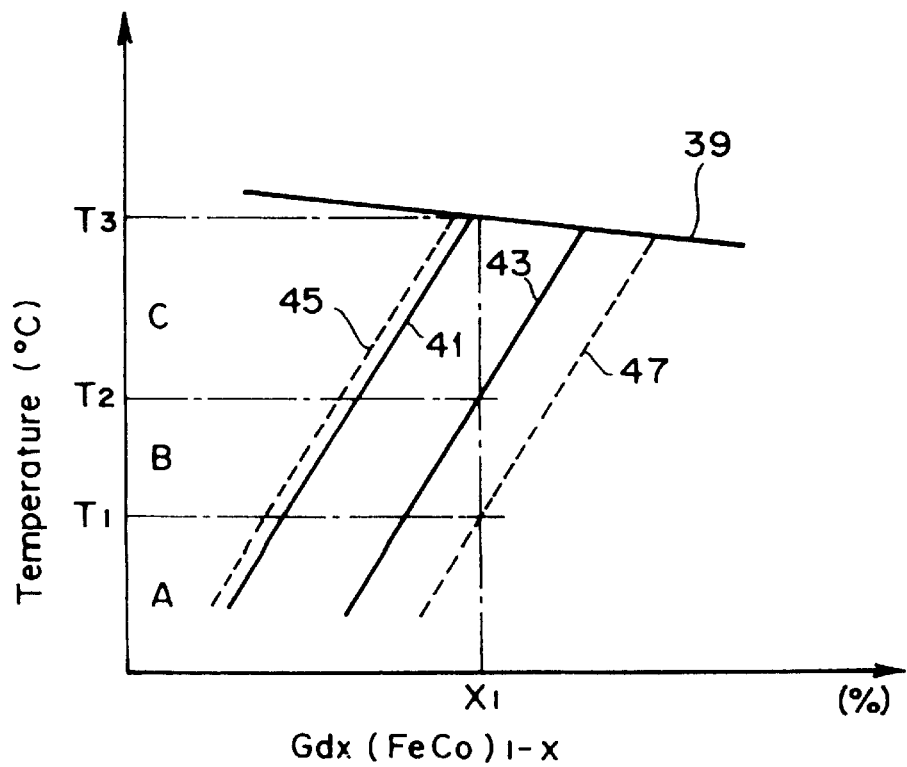
FIG. 16 illustrates a magnetized state of a GdFeCo film.

The principle of reproduction in this embodiment will now be described below with reference to FIGS. 16–18. FIG. 16 graphically shows the temperature range, where the GdFeCo film is turned to perpendicular magnetization, with respect to the amount of Gd. A solid line 39 represents the Curie temperature of GdFeCo. Solid lines 41 and 43 represent the case of a single layer film composed of GdFeCo, while broken lines 45 and 47 represent the case of a dual layer film which consists of a GdFeCo film and a recording film of perpendicular magnetization superposed thereon. More specifically, the solid line 41 indicates the temperature at which the single layer film of GdFeCo is turned from perpendicular magnetization to an in-plane one, and the solid line 43 indicates the temperature at which the single layer film of GdFeCo is turned from in-line magnetization to a perpendicular one. The broken line 45 indicates the temperature at which the dual layer film consisting of a GdFeCo film and a perpendicular magnetization film is turned from perpendicular magnetization to an in-plane one, and the broken line 47 indicates the temperature at which such dual layer film is turned from an in-plane magnetization to a perpendicular one.

As obvious from FIG. 16, it is seen that additional superposition of a perpendicular magnetization film on a GdFeCo film is effective to lower the temperature at which the magnetization is changed from an in-plane direction to a perpendicular direction. Here, take notice of a certain amount X1 of Gd. In FIG. 16, a symbol A signifies a temperature range of in-plane magnetization. Meanwhile a symbol B signifies a temperature range of perpendicular magnetization in the case of a dual layer film including a perpendicular magnetization film, or a temperature range of in-plane magnetization in the case of a single layer film. And another symbol C signifies a temperature range of perpendicular magnetization.

Figure 17:
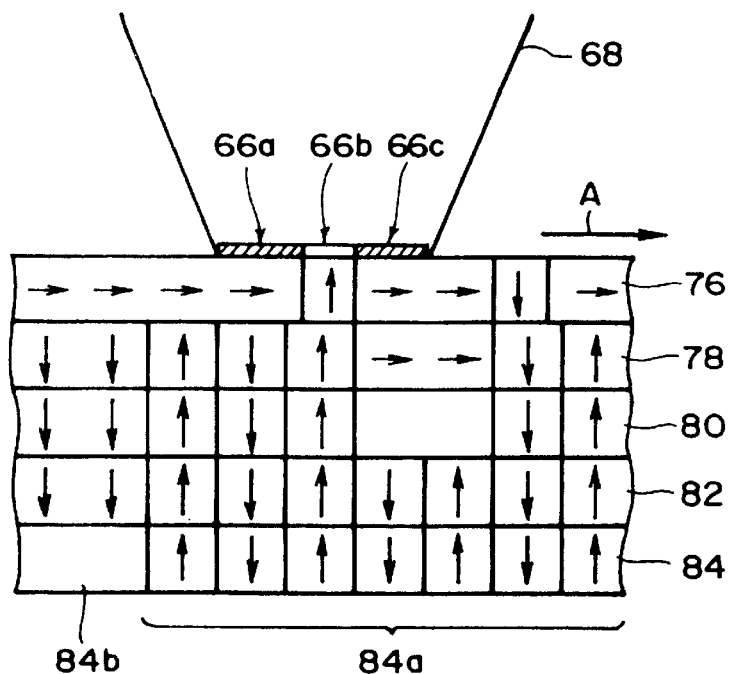
FIG. 17 illustrates how an ID area in the sixth embodiment is reproduced.

Referring next to FIG. 17, a description will be given on a method of reproducing an ID signal recorded in the magneto-optical recording medium of this embodiment. In the ID area 84a of the nonvolatile magnetic recording layer 84, an ID signal is recorded by heating the nonvolatile magnetic recording layer 84 beyond its Curie temperature while irradiating a high-power laser beam thereto. The data area 84b of the nonvolatile magnetic recording layer 84 adjacent to the ID area 84a is retained in an as-deposition state without being initialized at all. Therefore, even if a recording or erasing laser power used in an ordinary magneto-optical disk apparatus is irradiated to the ID area 84a, there exists no ppossibility that the ID signal recorded in the nonvolatile magnetic layer 84 is destroyed.

When a reproducing laser beam 68 is irradiated to the recording medium while moving the medium in a direction indicated by an arrow A, there is formed a temperature distribution which includes a low temperature region 66a, an intermediate temperature region 66b and a high temperature region 66c within a beam spot. The high temperature region 66c is heated beyond the Curie temperature of the switch layer 80. The reproducing auxiliary layer 78 has perpendicular magnetization in the low temperature region 66a and the intermediate temperature region 66b, but is turned to in-plane magnetization in the high temperature region 66c. Meanwhile the reproducing layer 76 has, in the low temperature region 66a, in-plane magnetization corresponding to the temperature range A shown in FIG. 16.

Since the reproducing auxiliary layer 78 has perpendicular magnetization in the intermediate temperature region 66b, the reproducing layer 76 also has perpendicular magnetization in this region. This magnetization corresponds to the case of the aforementioned dual layer film with a perpendicular magnetization film in the temperature range B of FIG. 16. Meanwhile the high temperature region 66c has in-plane magnetization as the reproducing auxiliary layer 78 has in-plane magnetization. This corresponds to the case of the aforementioned single layer film in the temperature range B of FIG. 16. If the high temperature region 66c is so preset that the switch layer 80 is heated above the Curie temperature thereof, magnetization of the reproducing auxiliary layer 78 is shielded from the perpendicular magnetization of the volatile magnetic recording layer 82, whereby stable in-plane magnetization is attained. In both of the low temperature region 66a and the high temperature region 66c, the reproducing layer 76 has in-plane magnetization which makes no contribution to the Kerr rotation of the reproducing laser beam, so that a mask can be formed.

The direction of magnetization of the ID signal recorded in the ID area 84a of the nonvolatile magnetic recording layer 84 can be read out through the intermediate temperature region 66b by watching the reflected light from the magnetization of the reproducing layer 76. More specifically, since the switch layer 80 is below the Curie point thereof, the magnetization of the nonvolatile magnetic recording layer 84 is transferred by exchange bonding successively to the volatile magnetic recording layer 82, the switch layer 80, the reproducing auxiliary layer 78 and the reproducing layer 76, whereby a magneto-optical signal can be obtained from the intermediate temperature region 66b.

According to this embodiment, two in-plane magnetization masks can be formed within the spot of the reproducing laser beam, so that the ID signal recorded in the nonvolatile magnetic recording layer 84 is reproducible at high resolution without the necessity of any reproducing magnetic field. Consequently there arises no problem of crosstalk between mutually adjacent tracks.

Figure 18:
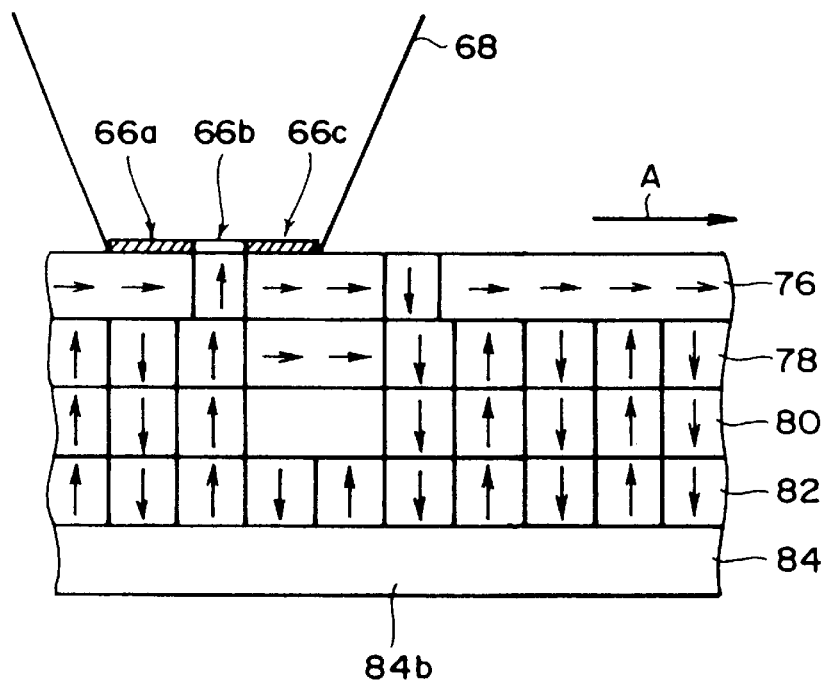
FIG. 18 illustrates how a data area in the sixth embodiment is reproduced.

FIG. 18 illustrates reproduction of a data area in the sixth embodiment of the present invention. As described above, a data area 84b of a nonvolatile magnetic recording layer 84 is in an as-deposition state immediately after manufacture of a medium. As explained with reference to FIG. 17, a low temperature mask region 66a and a high temperature mask region 66c are formed within a beam spot, and data recorded in a volatile magnetic recording layer 82 is transferred by exchange bonding to a reproducing layer 76, so that the data can be read out through an intermediate temperature region 66b.

In each of the preferred embodiments described hereinabove, an ID signal is recorded in the nonvolatile magnetic recording layer. However, it is also possible to record the ID signal in the volatile magnetic recording layer as well by adoption of the recording method relative to the third embodiment of the present invention mentioned with reference to FIGS. 7 through 11B.

The present invention can provide an improved magneto-optical recording medium which is capable of realizing a partial ROM with remarkable facility without the necessity of any particular processing on its substrate. Any dealer who wants to sell software to users may acquire mass-produced magneto-optical recording media of the present invention and can record desired software in the ROM areas thereof by employment of a low-cost exclusive apparatus producible with slight modification of a commercially available ordinary apparatus, and on the user side, there is no danger of losing the purchased software even by erroneous manipulation.

Furthermore, according to the specific embodiments of the invention adapted for land-groove recording, no crosstalk is caused between mutually adjacent tracks thereby ensure satisfactory reproduction of an ID signal with magnetically induced superresolution.

What is claimed is:

1. A magnetically induced superresolution magneto-optical recording medium for a recording/reproducing apparatus having a laser light source for heating a beam spot on the recording medium to a temperature (T) while rotating said recording medium at an operating speed, wherein a record mark smaller in diameter than a spot of a reproducing laser beam is reproduced, said recording medium comprising:

a magnetic reproducing layer;

a first magnetic recording layer formed on said magnetic reproducing layer, said first magnetic recording layer having a Curie temperature Tc1 approximately equal to or lower than the temperature T generated by the recording/reproducing apparatus; and a second magnetic recording layer formed on said first magnetic recording layer, said second magnetic recording layer having a Curie temperature Tc2 higher than the temperature T generated by the recording/reproducing apparatus, wherein said Curie temperatures satisfy Tc1<Tc2.

2. The magnetically induced superresolution magneto-optical recording medium according to claim 1, wherein a data area of each sector in said second magnetic recording layer is retained in a state which is not initialized.

3. The magnetically induced superresolution magneto-optical recording medium according to claim 1, wherein said magnetic reproducing layer is a perpendicular magnetization film.

4. The magnetically induced superresolution magneto-optical recording medium according to claim 1, wherein said magnetic reproducing layer is an in-plane magnetization film at a room temperature but becomes a perpendicular magnetization film when heated beyond a predetermined temperature by a reproducing laser beam.

5. A magnetically induced superresolution magneto-optical recording medium where a record mark smaller in diameter than a spot of a reproducing laser beam is reproduced, comprising:

a magnetic reproducing layer having an in-plane easy direction of magnetization at a room temperature but having an easy direction of magnetization perpendicular to a film plane when heated beyond a first predetermined temperature;

an auxiliary magnetic reproducing layer formed on said reproducing layer and having an easy direction of magnetization perpendicular to said film plane at the room temperature but having an in-plane easy direction of magnetization when heated beyond a second predetermined temperature;

a magnetic switch layer formed on said auxiliary reproducing layer and having an easy direction of magnetization perpendicular to said film plane;

a first magnetic recording layer formed on said magnetic switch layer and having an easy direction of magnetization perpendicular to said film plane; and a second magnetic recording layer formed on said first magnetic recording layer and having an easy direction of magnetization perpendicular to said film plane;

wherein respective Curie temperatures Tc1, Tc2, Tc3 and Tc4 of said reproducing layer, auxiliary reproducing layer, magnetic switch layer and first magnetic recording layer are greater than the room temperature and satisfy a condition of Tc1>Tc3, Tc2>Tc3 and Tc4>Tc3; and wherein said second magnetic recording layer has a Curie temperature Tc5 higher than a temperature generated by a recording/reproducing apparatus of a user.

6. A method of using a magneto-optical recording medium in a recording/reproducing apparatus having a laser light source for heating a beam spot on the recording medium to a temperature (T) while rotating said recording medium at an operating speed, the medium having a first magnetic recording layer having a first Curie temperature (Tc1) approximately equal to or lower than the temperature (T) generated by the recording/reproducing apparatus and a second magnetic recording layer formed on said first magnetic recording layer having a second Curie temperature (Tc2) higher than the temperature (T), said second magnetic recording layer being retained in a state which is initially uninitialized, said method comprising the steps of:

recording an information in a first portion of said recording medium as a ROM by heating the second recording layer to the second Curie temperature (Tc2);

initializing only said first magnetic recording layer in a remaining portion of the recording area; and using the first layer of said remaining portion as an information recording, reproducing and erasing RAM.

7. A method of using a magneto-optical recording medium according to claim 6, wherein the information in the first portion is recorded in said recording step by irradiating a laser beam to said recording medium while rotating said medium at recording speed lower than the operating speed.

8. A method of using a magneto-optical recording medium for a recording/reproducing apparatus having a laser light source for heating a beam spot at an operating light intensity on the recording medium to a first temperature (T1) while rotating said recording medium at an operating speed, the recording medium having a magnetic recording layer recording a rewritable mark at the first temperature (T1), said method comprising:

recording a mark on the magnetic recording layer with the characteristic of magnetization of the mark changed, while irradiating a laser beam at a higher intensity than the operating intensity for heating the recording medium to a second temperature (T2), at which the characteristic of magnetization of the magnetic recording layer is changed, higher than the first temperature (T1).

9. A magneto-optical recording medium for a recording/reproducing apparatus having a laser light source for heating a beam spot at an operating light intensity on the recording medium to a temperature (T) while rotating said recording medium at an operating speed, said magneto-optical recording medium comprising:

a magnetic recording layer for recording a rewritable mark at the temperature (T), said magnetic recording layer having a mark recorded thereon, wherein a magnetization characteristic of said recorded mark is altered by irradiating a laser beam on the recording medium and rotating the recording medium at a lower speed than the operating speed for heating the recording medium to a second temperature (T2), at which the characteristic of magnetization of the magnetic recording layer is changed, higher than the first temperature (T).

10. A magnetically induced superresolution magneto-optical recording medium for a recording/reproducing apparatus having a laser light source for heating a beam spot at an operating light intensity on the recording medium to a temperature (T) while rotating said recording medium at an operating speed, said magneto-optical recording medium comprising:

a magnetic recording layer for recording a rewritable mark at the temperature (T), said magnetic recording layer, having a mark recorded thereon, wherein a magnetization characteristic of said recorded mark is altered by irradiating a laser beam on the recording medium and rotating the recording medium at a lower speed than the operating speed for heating the recording medium to a second temperature (T2), at which the characteristic of magnetization of the magnetic recording layer is changed, higher than the first temperature (T).

11. A method of using a magneto-optical recording medium for a recording/reproducing apparatus having a laser light source for heating a beam spot on the recording medium to a first temperature (T1) while rotating said recording medium at an operating speed, the recording medium having a magnetic recording layer recording a rewritable mark at the first temperature (T1), said method comprising;

recording a mark on the magnetic recording layer with the characteristic of magnetization of the mark changed while irradiating a laser beam on the recording medium and rotating the recording medium at a lower speed than the operating speed for heating the recording medium to a second temperature (T2), at which the characteristic of magnetization of the magnetic recording layer is changed, higher than the first temperature (T1).

12. The method of using a magneto-optical recording medium according to claim 8, wherein said laser beam has a higher intensity than an operating intensity for heating the beam spot on the recording medium to the first temperature (T).

13. The magneto-optical recording medium according to claim 8, wherein said laser beam has a higher intensity than the operating intensity.

14. The magnetically induced superresolution magneto-optical recording medium according to claim 10, wherein said laser beam has a higher intensity than the operating intensity.

* * * * *

UNITED STATES PATENT AND TRADEMARK OFFICE
CERTIFICATE OF CORRECTION

PATENT NO. : 6,103,407
DATED : August 15, 2000
INVENTOR(S) : Izumi et al.

It is certified that error appears in the above-identified patent and that said Letters Patent is hereby corrected as shown below:

Delete claim 8 in its entirety and insert the following:

-- 8. A magneto-optical recording medium for a recording/reproducing apparatus having a laser light source for heating a beam spot on the recording medium to a temperature (T) while rotating said recording medium at an operating speed, said recording medium comprising:
  a first magnetic recording layer having a Curie temperature Tc1 approximately equal to or lower than the temperature T generated by the recording/reproducing apparatus; and
  a second magnetic recording layer formed on said first magnetic recording layer and having a Curie temperature Tc2 higher than the temperature T generated by the recording/reproducing apparatus, whereby recording and erasing information to/from the medium is achieved only by using a recording apparatus achieving the Curie temperature Tc2, wherein said Curie temperatures satisfy Tc1<Tc2. --

Claim 12,
Line 2, delete "8" and insert -- 11 -- therefor.

Claim 13,
Line 2, delete "8" and insert -- 9 -- therefor.

Signed and Sealed this

Twenty-seventh Day of November, 2001

*Attest:*

NICHOLAS P. GODICI
*Attesting Officer*  Acting Director of the United States Patent and Trademark Office